United States Patent [19]

Sturwold

[11] 4,395,286

[45] Jul. 26, 1983

[54] WATER-BASED COATING OIL

[75] Inventor: Robert J. Sturwold, Cincinnati, Ohio

[73] Assignee: The Cincinnati-Vulcan Company, Cincinnati, Ohio

[21] Appl. No.: 393,718

[22] Filed: Jun. 30, 1982

[51] Int. Cl.$^3$ ................................................ C09D 5/08
[52] U.S. Cl. ............................. 106/14.13; 106/14.15; 106/14.18; 106/14.37; 106/14.38; 106/243; 252/390; 252/391
[58] Field of Search ............... 106/14.13, 14.15, 14.18, 106/243, 14.37, 14.38; 252/390, 391

[56] References Cited

U.S. PATENT DOCUMENTS

| | | |
|---|---|---|
| 2,677,618 | 5/1954 | Deiman et al. . |
| 2,782,164 | 2/1957 | Fischer et al. . |
| 2,796,353 | 6/1957 | Dieman et al. .................... 106/14.13 |
| 2,796,408 | 6/1957 | Brehm et al. ..................... 106/14.13 |
| 2,880,095 | 3/1959 | Brehm et al. . |
| 2,882,227 | 4/1959 | Lindberg . |
| 2,883,277 | 4/1959 | Beiswanger et al. . |
| 2,890,928 | 6/1959 | Osipow . |
| 2,898,301 | 8/1959 | Mayhew et al. . |
| 2,948,598 | 8/1960 | Brehm . |
| 3,383,328 | 5/1968 | Baker et al. . |
| 3,441,419 | 4/1969 | Atterby . |
| 3,897,349 | 7/1975 | Marin et al. ......................... 252/34 |
| 3,981,682 | 9/1976 | Ward et al. . |

*Primary Examiner*—Lorenzo B. Hayes
*Attorney, Agent, or Firm*—Wood, Herron & Evans

[57] ABSTRACT

A water-based coating composition which upon drying prevents rust and corrosion on metal surfaces, but does not leave a waxy film upon the coated article. The coating composition is a mixture of a monovalent metal or amine, salt of a sulfonic acid, a polybasic fatty acid, an alkanolamide, a water soluble ether and water. The coating oil is a substitute for hydrocarbon-based coating oils and provides the rust protection and corrosion resistance of a hydrocarbon-based coating oil but does not cause a waxy buildup. This water-based coating is also more biodegradable and substantially safer than a hydrocarbon-based system.

13 Claims, No Drawings

WATER-BASED COATING OIL

BACKGROUND OF THE INVENTION

It is well known to use a coating oil to prevent rust and corrosion of metals. Particularly, these coating oils find application in coating machined articles as well as articles being processed such as sheets of cold rolled steel. These machined or processed metals are frequently stored in areas which are either high in humidity or where the atmosphere is highly corrosive. Therefore, a coating is required to prevent acid rust and corrosion.

These coatings can be classified into two broad classes. The first class is a hydrocarbon-based systems where the active ingredients are dissolved in a hydrocarbon solvent such as an alcohol, ether, alkane or olefin. The second class is water-based systems in which the active ingredients are dissolved in water. The two types of coatings should perform the same function.

The present invention is a water-based system. Prior art water-based systems have typically been formulated from a water soluble wax. When the water evaporates, the wax is left upon the surface of the article being coated. The wax is particularly undesirable in applications where the coated article is further processed. However, the water-based systems are preferred for several reasons. Since they do not use a hydrocarbon carrier, the evaporation products are basically water and hence, non-polluting. Furthermore, a water-based system is more easily biodegraded and accordingly, the potential pollution hazards are substantially reduced. A water-based system has an extremely high flash point or does not burn at all whereas a hydrocarbon-based system will easily flash. Finally, a water-based system is substantially less expensive since water is cheaper than a hydrocarbon carrier. This can be particularly important when the carrier can exceed 70% of the coating composition.

The major problem with a water-based system is maintaining the active components of the coating system in solution. This is typically referred to as compatibility. If the active components do not remain in solution, they will not uniformly coat a surface.

It is relatively easy to maintain certain coating agents in an aqueous solution, for example, water soluble waxes. But, it presents a substantial problem to provide active components in a water-based system in solution in sufficient quantity to prevent rust and acid corrosion and which do not cause a waxy buildup.

STATEMENT OF THE INVENTION

The invention is premised upon the realization that a specific mixture of active components can be combined with water to form a water-based oil coating system which effectively prevents rust and acid corrosion of metal surfaces. More specifically, the invention is a water active coating system formulated by blending a monovalent metal or amine salt of a sulfonic acid, a polybasic fatty acid, an alkanolamide, a water soluble ether and water. Using these active agents with water surprisingly provides a coating system which is compatible and effective in preventing rust and acid corrosion and does not cause a waxy buildup on the coated surface. This coating system is effective in preventing acid corrosion even under severe conditions.

DETAILED DESCRIPTION OF THE INVENTION

The water-based coating system of the present invention includes a monovalent metal or amine salt of a sulfonic acid, a polybasic acid, an alkanolamide formed by reacting a fatty acid and an alkanolamine, water soluble ether and water which are combined to provide a solution which can be easily applied to a metal surface by spraying, brushing, dipping, etc. to provide protection from rust and acid corrosion.

SULFONATES

Sulfonates are usually the reaction products of petroleum oils or olefins and sulfuric acid to produce sulfonic acids which are then neutralized with a base to form sulfonates. Illustrative examples of suitable sulfonic acids include mahogany sulfonic acids, petroleum sulfonic acids, monoeicosane-substituted naphthalene sulfonic acids, dodecylbenzene sulfonic acids, petrolatum sulfonic acids, monoeicosane-subbenzene sulfonic acids, cetyl-chlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane sulfonic acid, lauryl-cyclo-hexanesulfonic acids, polyethylene (M.W.-750) sulfonic acids, etc. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, diisononylbenzene sulfonic acid, di-isoocetadecylbenzene-sulfonic acid, stearyl-naphthalene sulfonic acid, dinonylnaphthalene sulfonic acid, and the like. The petroleum sulfonic acids are a well-known art recognized class of materials. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids, including cycloalkyl sulfonic acids, and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum napthene sulfonic acid, etc.

The structure of synthetic petroleum sulfonates is not as complex as the naturally derived petroleum sulfonates. These are designed to be similar to a natural sulfonate and are the sulfonation products of high molecular weight alkylated benzenes or naphthalenes. One synthetic sulfonate particularly useful in the present invention in a dialkyl naphthyl sulfonate having the following general formula:

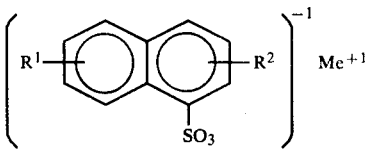

where Me is a cationic species and $R^1$ and $R^2$ are alkyl groups having about 5-20 carbon atoms. One sulfonate particularly useful is one where $R^1$ and $R^2$ each represents $C_9H_{19}$. Sulfonates with this formula are sold by R. T. Vanderbilt Company under the tradename Na Sul DTA (where Me represents diethyltriamine) Na Sul SS (where Me represents Na), and Na Sul 707 (where Me represents Li).

The neutralizing agent must be a monovalent cationic species. These would typically include the metal hydroxides formed from the group I metals as well as other monovalent species such as organic amines. It has been found that when the sulfonic acids are neutralized with either a divalent species such as the metal hydroxides of the divalent species or ammonium hydroxide, the formed sulfonate is not compatible in an aqueous system. Accordingly, the only sulfonates which are suitable for use in the present invention are monovalent cationic sulfonates where the cationic species is either a metal or an amine. Hereinafter, the term amine specifically excludes ammonia.

The petroleum sulfonates, in order to be compatible with the solution of the present invention, must also be substantially free of inorganic salts. Even 1% free inorganic salt is believed to make the petroleum sulfonate incompatible with the present system.

POLYBASIC ACID

The present invention further includes a polybasic fatty acid. Polymeric acids are particularly suited for use in the present invention.

The polymeric acids are obtained by the polymerization of unsaturated monocarboxylic acids. For instance, the $C_{36}$ dimer or $C_{54}$ trimer acids are obtained by the dimerization or trimerization of oleic acid, linoleic acid or mixtures thereof (e.g., tall oil fatty acids). The dimer acid has as its principal component a $C_{36}$ dibasic acid, and the trimer acid has a $C_{54}$ tribasic acid as its main component. Such $C_{36}$ dibasic or $C_{54}$ tribasic acids are commercially available under the trademark EMPOL Dimer and Trimer Acids by Emery Industries. These include Empol 1010 (97% dimer, 3% trimer), Empol 1014 (95% dimer, 4% trimer and 1% monomer), Empol 1018 (83% dimer, 17% trimer), and Empol 1024 (75% dimer, 25% trimer). Dimer acids containing greater than 75% by weight, and preferably more than 90% by weight, of $C_{36}$ dibasic acid having iodine values in the range of about 90-110 are commercially available and are useful. In addition, hydrogenated dimers having a maximum iodine value of about 35 and preferably not greater than 20 have also been found to be useful and are commercially available. Typically, in addition to the described $C_{36}$ dibasic acid content and iodine value, these dimer acids will have an acid value between about 180-215, saponification value from 190-205 and neutral equivalent of about 265-300. Trimer acids are usually contained in the dimer acid in small amounts of up to about 25% by weight. Also, 90% $C_{54}$ trimer acid containing about 10% $C_{36}$ dimer acid is available as EMPOL 1040 and is suitable for use in this invention.

Other polybasic fatty acids such as $C_{21}$ diacids such as Westvaco Chemical 1550 diacid perform satisfactorily in the present invention as well as pure trimer acid. Acids which were used which were unsatisfactory included oleic acid, rosin acid, adipic acid and boric acid. These acids are either not compatible or do not provide the needed protection against acid corrosion.

ALKANOLAMIDE

The solution of the present invention further includes an alkanolamide formed by reacting a $C_{12}-C_{22}$ fatty acid with a primary or secondary alkanolamine. The product is actually a mixture of alkanolamides and unreacted alkanolamines. However, these are generally referred to as alkanolamides.

The alkanolamines are compounds containing up to about 20 carbon atoms per molecule and have the formula:

where R is a hydroxyalkyl group and Y is the same or a different group selected from hydrogen, alkyl and hydroxyalkyl.

Suitable alkanolamines include, for example, monoethanolamine, isopropanolamine, N-methyl ethanolamine, N-ethyl ethanolamine, N-methyl isopropanolamine and N-ethyl isopropanolamine, diethanolamine, N-methyl ethanolamine, N-ethyl ethanolamine and diisopropanolamine.

The carboxylic acids are fatty acids containing from 12 to 22 carbon atoms, inclusive, preferably 16 to 18. Suitable aliphatic acids are saturated acids, for example, lauric, myristic, palmitic and stearic acids; or unsaturated acids, for example linoleic, oleic and undecylenic acids. A mixture of aliphatic acids may be used, for example, tall oil acids or lard oil acids.

The acid must be $C_{12}$ or larger or the formed salt will not be sufficiently hydrophobic to repel water. The fatty acid could be larger than $C_{22}$, but such large fatty acids are generally not commercially available.

Alkanolamides are prepared by condensing a primary or secondary alkanolamine with a fatty acid. The reaction is carried out at 100° C. or greater, but below the decomposition temperature of the resulting product. An alkali metal alkoxide catalyst such as sodium methoxide can also be employed. These methods are well known and alkanolamides are readily available.

Commercially available alkanolamides generally contain unreacted alkanolamine as well as a minor amount of other byproducts. Generally, the alkanolamides are 60-90% alkanolamide with the remaining 10-40% mostly made up of unreacted alkanolamine with a slight amount of amine esters and diesters, amide esters and diesters, and piperazine derivatives. Therefore, in this specification, as well as the claims, alkanolamide refers to a solution containing at least about 60% alkanolamide.

Commercially available alkanolamides include EM 980 sold by Keil Chemical and formed from diethanolamine and lard oil acid, Clintwood Chemical's Clindral 200-0, a diethanolamide of oleic acid, and Clintwood Chemical's Clindral 200S, a diethanolamide of stearic acid.

SOLVENT

The coating also includes a solvent. The solvent insures that a clear, compatible system is maintained. The solvent must be a water soluble ether, preferably an alkyl ether of ethylene glycol. Specifically, butoxy and ethoxy ethanol have been found to work in the present invention. When solvents such as isopropyl alcohol or stoddard solvent are used, the system was not compatible. Other water soluble ethers such as diethyl ether function, but are extremely volatile and therefore, very hazardous.

The solution is prepared by simply blending the sulfonate, the polybasic fatty acid or mixture of acids, the alkanolamide, the solvent and water. Gentle agitation is all that is required to create a clear, stable homogeneous solvent solution.

The solution is used by applying the solution to a metal surface such as iron, aluminum, brass, etc. The solution is then allowed to dry, thereby forming a protective coating on the metal surface. The solution can be applied by dipping, brushing or spraying.

The solution of the present invention was tested and compared with non-functioning systems using three tests:

(1) Rust test;
(2) Acid corrosion test; and
(3) Aluminum stain test.

RUST TEST

The rust test is conducted by placing iron filings on a piece of filter paper in a petrie dish. The filings are covered with the test solution. After drying in air, the filings are examined for rust and the filter paper is checked for rust stains.

ACID CORROSION TEST

The acid corrosion test is conducted using panels of twelve (12) carbon cold rolled steel which are thoroughly cleaned by immersion in concentrated hydrochloric acid. The panels were then washed with water and then isopropyl alcohol. After drying with a paper tissue, the panels were polished with steel wool. The cleaned and polished panels were dipped into the test solution and air dried for one hour. The panels were then suspended in a loosely covered beaker containing 5% hydrochloric acid. The beaker was heated to 200° F. for four hours, the heater turned off and the covered beaker allowed to stand overnight. The panels were then examined for corrosion and staining.

ALUMINUM STAIN TEST

Clean aluminum strips were dipped into the test solutions and were allowed to air dry for one half hour. After drying, the strips were suspended ¼ inch in front of the side arm of a stoppered filtration flask containing vigorously boiling water. After ten (10) minutes spray time, the strips were examined for water stain.

These tests were used to establish the criticality of the individual components as well as the effective concentration of each of these components.

The following tables list specific percentages of individual components used in specific solutions. Although those amounts demonstrate operative system as well as what is believed to be the best mode, the present invention in its broadest scope is not limited to these specific percentages.

SULFONATES

Different coating compositions were made using different sulfonates and the other essential components to determine their suitability. The blends were checked for compatibility and were tested for rust and acid corrosion protection. The other components were kept constant. From these tests, it was determined that suitable sulfonates include monovalent metal sulfonates and amine sulfonates. Those which are unsuitable due to their lack of compatibility are ammonium sulfonates, polyvalent metal sulfonates and sulfonates containing about 1% by weight or more free organic salts.

In the following table, the percentage sulfonate indicates the weight percentage of a solution of sulfonates in a mineral oil diluent. The concentration of the sulfonates in the solution is about 60% in all cases. The percentage of actual sulfonate is given in parenthesis next to the percentage of the sulfonate mineral oil solution.

TABLE I
AMMONIA AND AMINE SULFONATES

| Comp. Wt. % | | |
|---|---|---|
| Na Sul A S | 12 (7.2) | |
| Na Sul D T A | | 12 (7.2) |
| Dimer Acid | 2 | 2 |
| EM-980 | 5 | 5 |
| Butyl Cellosolve | 10 | 10 |
| Water | 71 | 71 |
| Appearance | Amber Liquid Not Completely Comp. | Clear Amber Liquid |
| Rust Test | OK | OK |
| Acid Corr. Test | OK | OK |
| Description of Components | | |
| Na Sul A S | Ammonium Petroleum Sulfonate | R. T. Vanderbilt |
| Na Sul D T A | Diethylene Triamine Petroleum Sulfonate | R. T. Vanderbilt |
| Dimer Acid | Empol 1018 (Tall Oil Bsd.) | Emery Ind., Inc. |
| EM-980 | Lard Oil Alkanolamide (25% Diethanolamine) | Keil Chemical |

TABLE II
MONOVALENT METALLIC SULFONATES

| Comp. Wt. % | | | | |
|---|---|---|---|---|
| Na 1660 | 12 (7.2) | | | |
| Na 1960 | | 12 (7.2) | | |
| Na Sul SS | | | 12 (7.2) | |
| Na Sul 707 | | | | 12 (7.2) |
| Dimer Acid | 2 | 2 | 2 | 2 |
| EM-980 | 5 | 5 | 5 | 5 |
| Butyl Cellosolve | 10 | 10 | 10 | 10 |
| Water | 71 | 71 | 71 | 71 |
| Appearance | Cl. Yellow Liquid | Cl. Yellow Liquid | Cl. Yellow Liquid | Cl. Yellow Liquid |
| Rust Test | OK | OK | OK | OK |
| Acid Corr. Test | OK | OK | OK | OK |
| Description of Components | | | | |
| Na 1660 | Sodium Petroleum Sulfonate 60% Conc. Avg. M.W. 460 | N. L. Kimes | | |
| Na 1960 | Sodium Petroleum Sulfonate 60% Conc. Avg. M.W. 525 | N. L. Kimes | | |
| Na Sul SS | Sodium Petroleum Sulfonate | R. T. Vanderbilt | | |
| Na Sul 707 | Lithium Petroleum | R. T. Vanderbilt | | |

TABLE II-continued
MONOVALENT METALLIC SULFONATES

| Sulfonate |
|---|
| The organic portion of the Na Sul petroleum sulfonates is dinonylnaphthalene. |

TABLE III
SYNTHETIC SULFONATES

| Comp. Wt. % | | |
|---|---|---|
| Aristonate 460 | 12 (7.2) | |
| Aristonate 500 | | 12 (7.2) |
| Dimer Acid | 2 | 2 |
| EM-980 | 5 | 5 |
| Butyl Cellosolve | 10 | 10 |
| Water | 71 | 71 |
| Appearance | Clear Amber Liquid | Clear Amber Liquid |
| Rust Test | OK | OK |
| Acid Corr. Test | Corrosion | Corrosion |
| Description of Components | | |
| Aristonate 460* | Sodium Dialkylaryl Sulfonate | Pilot Chemical |
| Aristonate 500* | Sodium Dialkaryl Sulfonate | Pilot Chemical |

*These sulfonates contain about 1% free inorganic salts.

TABLE IV
DIVALENT METALLIC SULFONATES

| Comp. Wt. % | | | | |
|---|---|---|---|---|
| Na Sul B S N | 12 (7.2) | | | |
| Ca 6957 | | 12 (7.2) | | |
| Na Sul 729 | | | 12 (7.2) | |
| Na Sul Z S | | | | 12 (7.2) |
| Dimer Acid | 2 | 2 | 2 | 2 |
| EM-980 | 5 | 5 | 5 | 5 |
| Butyl Cellosolve | 10 | 10 | 10 | 10 |
| Water | 71 | 71 | 71 | 71 |
| Appearance | Yellow Liquid Not Comp. | Yll. Liq. Not Comp. | Yll. Liq. Not Comp. | Emulsion Not Comp. |
| Rust Test | OK | OK | OK | OK |
| Acid Corr. Test | OK | OK | OK | OK |
| Description of Components | | | | |
| Na Sul B S N | Barium Petroleum Sulfonate | | R. T. Vanderbilt | |
| Ca 6957 | Calcium Petroleum Sulfonate | | N. L. Kimes | |
| Na Sul 729 | Calcium Petroleum Sulfonate | | R. T. Vanderbilt | |
| Na Sul Z S | Zinc Petroleum Sulfonate | | R. T. Vanderbilt | |

Blends were prepared in which different sulfonate levels were used. To accommodate the different levels, the alkanolamide and butyl cellosolve ratios were adjusted so that compatible systems were achieved. The dimer acid level was kept constant. Properties and test results are presented in Table V.

TABLE V
SULFONATE LIMITS

| Comp. Wt. % | | | | |
|---|---|---|---|---|
| Na Sul S S | 6 (3.6) | 12 (7.2) | 18 (10.8) | 24 (15.6) |
| Dimer Acid | 2 | 2 | 2 | 2 |
| EM-980 | 5 | 5 | 12.5 | 15 |
| Butyl Cellosolve | 10 | 10 | 15 | 15 |
| Water | 77 | 71 | 52.5 | 44 |
| Appearance | Clear Yellow Liquid | Clear Yellow Liquid | Clear Yellow Liquid | Clear Yellow Visc. Liq. |
| Rust Test | OK | OK | OK | OK |
| Acid Corr. Test (4 hrs.) | Slight | OK | OK | OK |
| Acid Corr. Test (6 hrs.) | Mod. | OK | OK | OK |

As indicated in Table V, when less than about 4% sulfonate was present, the coating did not provide the corrosion resistance provided by the coatings with higher concentrations of sulfonates. At 15.6%, the solution become viscous yet still prevented rust and acid corrosion.

DIFFERENT POLYBASIC ACIDS

Coating compositions were made using different grades of polybasic acids and other essential components to check their utility. The blends were examined for compatibility, rust and acid corrosion protection. Properties and test results are presented in Table VI. All components were kept at a constant use level in the blends.

TABLE VI
DIFFERENT POLYBASIC ACIDS

| Comp. Wt. % | | | | |
|---|---|---|---|---|
| Na Sul S S | 12 (7.2) | 12 (7.2) | 12 (7.2) | 12 (7.2) |
| E-1018 Dimer | 2 | | | |
| E-1012 Dimer | | 2 | | |
| E-1010 | | | 2 | |
| 1550 Di-Acid | | | | 2 |
| EM-980 | 5 | 5 | 5 | 5 |
| Butyl Cellosolve | 10 | 10 | 10 | 10 |
| Water | 71 | 71 | 71 | 71 |
| Appearance | Clear Yellow Liquid | Cl. Yell. Liquid | Hazy Yell. Liquid | Cl. Yell. Liquid |
| Rust Test | OK | OK | OK | OK |
| Acid Corr. Test | OK | OK | OK | OK |
| Description of Components | | | | |
| E-1018 Dimer | Tall Oil Based Dimer | | Emery Ind., Inc. | |
| E-1012 | Tall Oil Based Dimer | | Emery Ind., Inc. | |
| E-1010 Dimer | Oleic Based Dimer | | Emery Ind., Inc. | |
| 1550 Di-Acid | $C_{21}$ Di-Acid | | Westvaco Chemical | |

Blends were made in which different acids were used in place of the polybasic fatty acid in the formulation. All other components were kept constant. The blends were tested for compatibility, rust and acid corrosion protection. Composition and test data are presented in Table VII. Dimer containing blends are included for comparison.

TABLE VII
OTHER ACIDS

| Comp. Wt. % | | | | | |
|---|---|---|---|---|---|
| Na Sul S S | 12 (7.2) | 12 (7.2) | 12 (7.2) | 12 (7.2) | 12 (7.2) |
| E-1018 Dimer | 2 | | | | |
| Oleic Acid | | 2 | | | |
| M-35 Rosin Acid[1] | | | 2 | | |
| Adipic Acid | | | | 2 | |
| Boric Acid | | | | | 2 |
| EM-980 | 5 | 5 | 5 | 5 | 5 |
| Butyl Cellosolve | 10 | 10 | 10 | 10 | 10 |
| Water | 71 | 71 | 71 | 71 | 71 |
| Appearance | Clear Yellow Liquid | Clear Yellow Liquid | Clear Yellow Liquid | N.C. | Clear Yellow Liquid |
| Rust Test | OK | OK | OK | | OK |
| Acid Corr. Test (4 hours) | OK | Slight | Slight | | Heavy |

TABLE VII-continued
OTHER ACIDS

| | | | | |
|---|---|---|---|---|
| Acid Corr. Test (6 hours)[2] | OK | Heavy | Heavy | — |

[1]Rosin/Tall Oil Acid from Westvaco Chemical.
[2]Samples from four (4) hour Acid Corr. Test were retested for Two (2) more hours.
N.C. = not compatible.

POLYBASIC ACID

Blends were prepared using different levels of polybasic acid. The alkanolamide and butyl cellosolve ratio was adjusted to achieve a compatible system. The sulfonate level was kept constant. These data are presented in Table VIII.

TABLE VIII
DIMER ACID LIMITS

| Comp. Wt. % | | | | | | |
|---|---|---|---|---|---|---|
| Na Sul SS | 12 (7.2) | 12 (7.2) | 12 (7.2) | 12 (7.2) | 12 (7.2) | 12 (7.2) |
| Dimer Acid | — | 1 | 2 | 4 | 6 | 12 |
| EM-980 | 5 | 5 | 5 | 7.5 | 10 | 25 |
| Butyl Cellosolve | 10 | 10 | 10 | 10 | 10 | 30 |
| Water | 73 | 72 | 71 | 66.5 | 62 | 21 |
| Appearance | Clear Yellow Liquid | Clear Yellow Liquid | Clear Yellow Liquid | Clear Yellow Liquid | Clear Yellow Liquid | Clear Yellow Liquid |
| Rust Test | OK | OK | OK | OK | OK | OK |
| Acid Corr. Test (4 hrs) | Heavy | OK | OK | OK | OK | OK |
| Acid Corr. Test (6 hrs) | — | OK | OK | OK | OK | Slight |

ALKANOLAMIDE

Different coating solutions were made using different alkanolamides in the formulations. The blends were tested for compatibility, rust and acid corrosion protection. All other components were kept constant. These data are presented in Table IX.

TABLE IX
DIFFERENT ALKANOLAMIDES

| Comp. Wt. % | | | |
|---|---|---|---|
| Na Sul S S | 12 (7.2) | 12 (7.2) | 12 (7.2) |
| E-1018 Dimer | 2 | 2 | 2 |
| EM-980 | 5 | | |
| Clindrol 200-D | | 5 | |
| Clindrol 200-S | | | 5 |
| Butyl Cellosolve | 10 | 10 | 10 |
| Water | 71 | 71 | 71 |
| Appearance | Clear Yellow Liquid | Clear Yellow Liquid | Clear Yellow Liquid |
| Rust Test | OK | OK | OK |
| Acid Corr. Test (4 hrs.) | OK | OK | OK |
| Acid Corr. Test (6 hrs.) | OK | OK | OK |
| Description of Components | | | |
| EM-980 | Lard Oil Alkanolamide | | Keil Chemical |
| Clindrol 200-O | Oleic Alkanolamide | | Clintwood Chemical |
| Clindrol 200S | Stearic Alkanolamide | | Clintwood Chemical |

Blends were prepared with and without an alkanolamide. The blends were checked for compatibility, rust and acid corrosion protection. All other components were kept constant. These data are presented in Table X.

TABLE X
ALKANOLAMIDE - ESSENTIAL COMPONENT

| Comp. Wt. % | | | | | | |
|---|---|---|---|---|---|---|
| Na Sul SS | 12 (7.2) | 12 (7.2) | | | | |
| Na 1660 | | | 12 (7.2) | 12 (7.2) | | |
| Na 1960 | | | | | 12 (7.2) | 12 (7.2) |
| E-1018 Dimer | 2 | 2 | 2 | 2 | 2 | 2 |
| EM-980 | 5 | | 5 | | 5 | |
| Butyl Cellosolve | 10 | 10 | 10 | 10 | 10 | 10 |
| Water | 71 | 76 | 71 | 76 | 71 | 76 |
| Appearance | Clear Yellow Liquid | Not Compat. | Clear Amber Liquid | Clear Amber Liquid | Clear Amber Liquid | Clear Amber Liquid |
| Rust Test | OK | | OK | Heavy | OK | Heavy |
| Acid Corr. Test | OK | | OK | Heavy | OK | Heavy |

WATER SOLUBLE ETHER SOLVENTS

Blends were prepared using different sulfonates, polybasic fatty acids, alkanolamides and water. In all cases, it was necessary to add a water soluble ether to achieve clear compatible systems. Other type solvents such as isopropyl alcohol or stoddard solvent did not give compatible systems.

The concentration of the alkanolamide and the solvent is not critical. These concentrations are varied to obtain a compatible system. In general, the alkanolamide and solvent will each make up about 2–30% of the coating solution and preferably, about 5–15%.

Several blends were made to test the affect of dilution on rust and acid corrosion protection properties. These data are shown in Table XI.

TABLE XI
EFFECTS OF DILUTION

| Comp. Wt. % | | | | | |
|---|---|---|---|---|---|
| Na Sul SS | 12 (7.2) | 6 (3.6) | 4 (2.4) | | |
| Na Sul AS | | | | | |
| Na 1660 | | | | 12 (7.2) | 6 (3.6) |
| Dimer Acid | 2 | 1 | .4 | 2 | 1 |
| EM-980 | 5 | 2.5 | 1.7 | | |
| Butyl Cellosolve | 10 | 5 | 3.3 | 10 | 5 |
| Water | 71 | 85.5 | 90.6 | 76 | 88 |
| Appearance | Clear Yellow Liquid | Clear Yellow Liquid | Clear Yellow Liquid | Clear Amber Liquid | Clear Yellow Liquid |
| Rust Test | OK | OK | OK | Heavy | Heavy |
| Acid Corr. Test | OK | Slight | Heavy | Heavy | Heavy |

FREEZE THAW PROPERTIES

A blend was prepared and placed in a freezer at 15°–20° F. for 12 hours. The blend did not freeze solid, but formed a soft slush which slowly unthawed at room temperature. A very small amount of floculent material remained after the product unthawed which went into solution with mild agitation. The blend used is presented in Table XII.

TABLE XII
FREEZE THAW BLEND

| Comp. Wt. % | |
|---|---|
| Na Sul S S | 12 (7.2%) |
| Dimer Acid | 2 |
| EM-980 | 5 |

TABLE XII-continued

FREEZE THAW BLEND

| Comp. Wt. % | |
|---|---|
| Butyl Cellosolve | 10 |
| Water | 71 |

WATER STAIN PROTECTION OF ALUMINUM

Blends were prepared and tested for water stain protection of aluminum. The blends made and test data are presented in Table XIII.

TABLE XIII

ALUMINUM WATER STAIN TESTS

| Comp. Wt. % | | | | | |
|---|---|---|---|---|---|
| Na Sul As | 12 (7.2) | | | | |
| Na Sul 707 | | 12 (7.2) | | | |
| Na Sul D T A | | | 12 (7.2) | | |
| Na Sul SS | | | | 12 (7.2) | |
| Aristonate 460 | | | | | 12 (7.2) |
| Dimer Acid | 2 | 2 | 2 | 2 | 2 |
| EM-980 | 5 | 5 | 5 | 5 | 5 |
| Butyl Cellosolve | 10 | 10 | 10 | 10 | 10 |
| Water | 71 | 71 | 71 | 71 | 71 |
| Test Result | No Stain | No Stain | No Stain | Slight Stain | Stain |

The foregoing data indicate that the present invention is a mixture of four critical components which when mixed together in amounts which provide a compatible system, exhibit improved performance. These components combine to provide a water based coating which:

(1) prevents rust;
(2) prevents acid corrosion;
(3) prevents water stain;
(4) does not leave a waxy film on the coated surface; and
(5) exhibits excellent freeze thaw properties.

Having thus described my invention, I claim:

1. An aqueous coating composition for providing corrosion and rust protection for metal surfaces comprising a compatible mixture of the following components:
   a sulfonate selected from the group consisting of monovalent metal and amine salts of sulfonic acids;
   a polybasic fatty acid;
   an alkanolamide; and
   a water soluble ether wherein said components are provided in an effective amount to provide rust and corrosion protection for a metal surface and to provide a compatible solution.

2. An aqueous coating composition as claimed in claim 1 wherein said polybasic fatty acid is selected from the group consisting of $C_{36}$ dimer acid, $C_{54}$ trimer acid and mixtures of $C_{36}$ dimer acid and $C_{54}$ trimer acid.

3. An aqueous coating composition as claimed in claim 1 wherein said water soluble ether comprises an alkyl ether of ethylene glycol.

4. An aqueous coating composition as claimed in claim 3 wherein said alkyl ether of ethylene glycol comprises monobutyl ether of ethylene glycol.

5. An aqueous coating composition as claimed in claim 1 wherein said sulfonate is a petroleum sulfonate.

6. An aqueous coating composition as claimed in claim 5 wherein the petroleum sulfonate is an alkali metal sulfonate.

7. An aqueous coating composition as claimed in claim 5 wherein the petroleum sulfonate is an amine petroleum sulfonate.

8. An aqueous coating composition as claimed in claim 1 comprising from about 1 to about 12% polybasic fatty acid.

9. An aqueous coating composition as claimed in claim 8 comprising from about 3.6 to about 15.6% sulfonate.

10. An aqueous coating composition as claimed in claim 1 wherein said sulfonate is a dialkyl naphthyl sulfonate.

11. An aqueous coating composition as claimed in claim 8 wherein said polybasic fatty acid comprises a mixture of $C_{36}$ dimer and $C_{54}$ trimer acid and wherein said mixture further comprises at least about 75% $C_{36}$ dimer acid.

12. An aqueous coating composition as claimed in claim 1 wherein said alkanol amide is selected from the group consisting essentially of the dialkanolamide of oleic acid, the dialkanolamide of stearic acid and the dialkanolamide of lard oil acid.

13. An aqueous coating composition for providing rust and corrosion protection for a metal surface comprising a compatible mixture of the following components:
   from about 3.6% to about 7.2% organic sulfonate selected from groups consisting of monovalent metal sulfonates and amine sulfonates;
   from about 2% to about 30% alkanolamide;
   from about 2% to about 30% water soluble ether; and
   from about 1% to about 12% of a mixture of $C_{36}$ and $C_{54}$ polybasic fatty acids.

* * * * *